(12) United States Patent
Crutchfield et al.

(10) Patent No.: US 11,912,628 B1
(45) Date of Patent: Feb. 27, 2024

(54) SLURRY INFILTRATION FIXTURE

(71) Applicant: Rolls-Royce High Temperature Composites, Inc., Cypress, CA (US)

(72) Inventors: Jeffrey Crutchfield, Cypress, CA (US); Camila Bortoluzzi, Cypress, CA (US)

(73) Assignee: Rolls-Royce High Temperature Composites, Inc., Cypress, CA (US)

( * ) Notice: Subject to any disclaimer, the term of this patent is extended or adjusted under 35 U.S.C. 154(b) by 0 days.

(21) Appl. No.: 17/646,409

(22) Filed: Dec. 29, 2021

(51) Int. Cl.
*C04B 35/628* (2006.01)
*C04B 35/80* (2006.01)

(52) U.S. Cl.
CPC ........ *C04B 35/62892* (2013.01); *C04B 35/80* (2013.01); *C04B 2235/616* (2013.01)

(58) Field of Classification Search
None
See application file for complete search history.

(56) References Cited

U.S. PATENT DOCUMENTS

| | | | | |
|---|---|---|---|---|
| 3,010,847 | A | * | 11/1961 | Ewing ............... D06B 5/00 427/296 |
| 3,042,546 | A | * | 7/1962 | Henningsen ......... F16L 58/12 427/230 |
| 5,362,228 | A | | 11/1994 | Vaudel |
| 5,436,042 | A | | 7/1995 | Lau et al. |
| 6,450,117 | B1 | | 9/2002 | Murugesh et al. |
| 6,669,988 | B2 | | 12/2003 | Daws et al. |
| 9,498,903 | B2 | | 11/2016 | Lyons et al. |
| 10,017,424 | B2 | | 7/2018 | Landwehr |
| 2007/0275339 | A1 | | 11/2007 | Cress et al. |
| 2019/0367418 | A1 | | 12/2019 | Harris |
| 2021/0147302 | A1 | | 5/2021 | Bortoluzzi et al. |
| 2021/0155558 | A1 | | 5/2021 | Bortoluzzi et al. |

FOREIGN PATENT DOCUMENTS

| | | | |
|---|---|---|---|
| CN | 208893938 U | * | 5/2019 |
| EP | 1501963 B1 | | 2/2005 |
| WO | 96007533 A1 | | 3/1996 |
| WO | 96015285 A1 | | 5/1996 |

* cited by examiner

*Primary Examiner* — Alexander M Weddle
(74) *Attorney, Agent, or Firm* — Shumaker & Sieffert, P.A.

(57) ABSTRACT

In some examples, a slurry infiltration fixture. The infiltration fixture includes a fixture main body that includes a slurry introduction channel and a plurality of fixture walls defining a cavity configured to receive a porous component. The cavity includes a component volume and a reservoir volume. The plurality of fixture walls includes a shape configured to define a fixed offset between the porous component and the plurality of fixture walls and a fixed volume for slurry between the plurality of fixture walls and the porous component. The slurry introduction channel is configured introduce the slurry into the cavity through an opening proximate a bottom of the cavity.

19 Claims, 7 Drawing Sheets

SLURRY INFILTRATION FIXTURE

TECHNICAL FIELD

The present disclosure relates to, in some examples, devices for holding components during coating or slurry infiltration.

BACKGROUND

In many processes, components or parts are coated or infiltrated by a liquid or slurry. In the manufacture of some CMC (ceramic matrix composite) components, components are infiltrated with a slurry to change one or more physical, chemical, or electrical properties of the component.

SUMMARY

In one example, the disclosure is directed to a slurry infiltration fixture comprising: a fixture main body that comprises a slurry introduction channel and a plurality of fixture walls defining a cavity configured to receive a porous component, wherein the cavity includes a component volume and a reservoir volume; wherein the plurality of fixture walls comprise a shape configured to define a fixed offset between the porous component and the plurality of fixture walls and a fixed volume for slurry between the plurality of fixture walls and the porous component; and wherein the slurry introduction channel is configured introduce the slurry into the cavity through an opening proximate a bottom of the cavity.

In another example, the disclosure is directed to a method of slurry infiltration, the method comprising: positioning a porous component in a component volume of a cavity defined by a fixture main body of a slurry infiltration fixture, wherein the cavity includes the component volume and a reservoir volume, wherein the fixture main body defines a slurry introduction channel, wherein the plurality of fixture walls comprise a shape configured to define a fixed offset between the porous component and the plurality of fixture walls and a fixed volume for slurry between the plurality of fixture walls and the porous component; and introducing slurry into the cavity through the slurry introduction channel, wherein the slurry introduction channel comprises an opening into the cavity proximate to a bottom of the cavity.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like symbols in the drawings indicate like elements.

DETAILED DESCRIPTION

Figure 1:
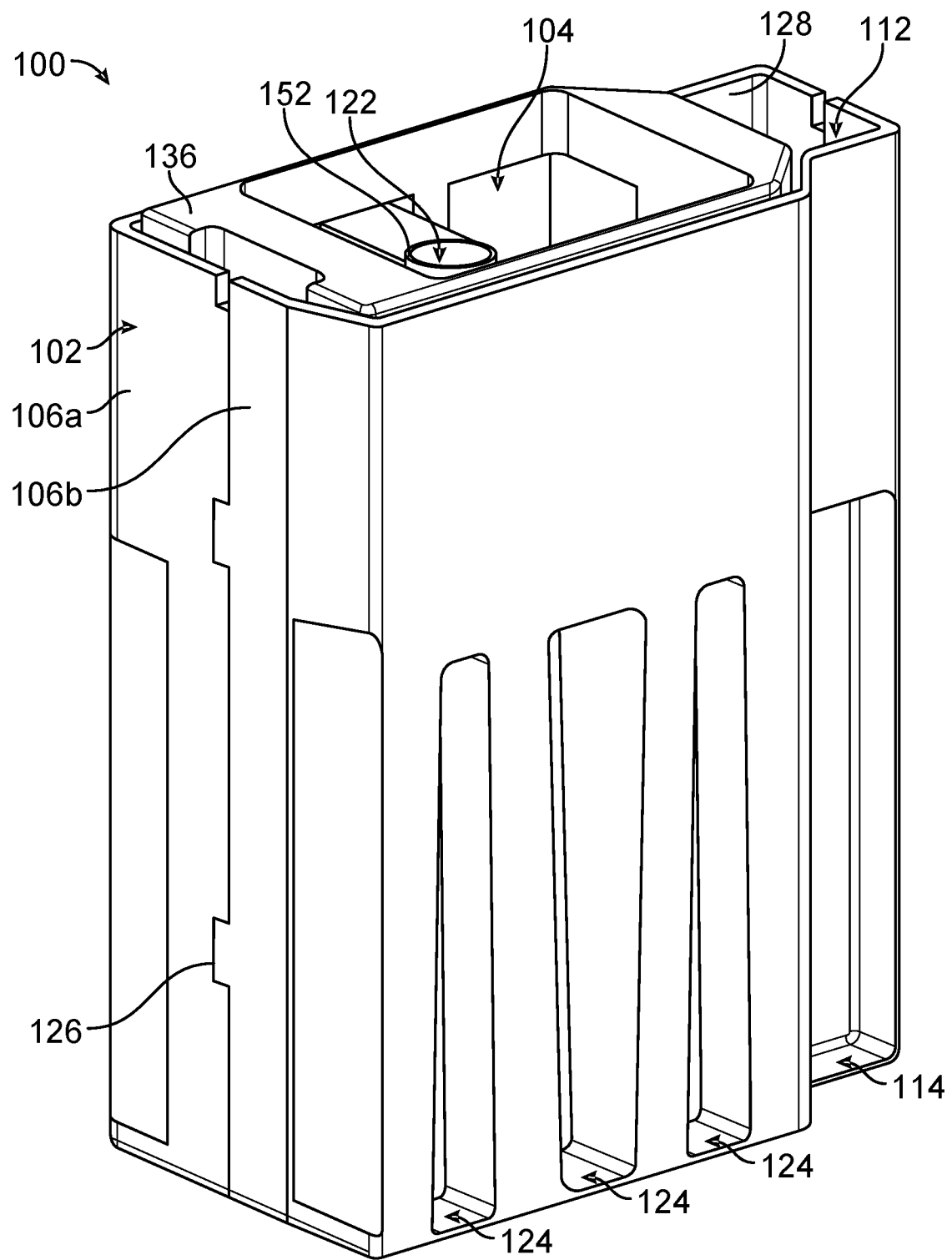
FIG. 1 is a schematic perspective view illustrating an example slurry infiltration fixture, in accordance with some examples of the present disclosure.

Manufacture of ceramic matrix composite (CMC) components may include a slurry infiltration step during which slurry flows across at least a portion of a porous component or batch of porous components. During slurry infiltration, the slurry may penetrate pores of the porous component under applied pressure (above atmospheric pressure), an applied vacuum (below atmospheric pressure), and/or atmospheric pressure. A slurry may, in addition to infiltration of the porous component or components, coat the exterior of the component during slurry infiltration. Following infiltration, the slurry may be cured into and/or onto the porous component, assisting in densifying, rigidizing, or imparting other physical, chemical, or electrical properties to the component or batch of components.

In some slurry infiltration systems, a slurry and the porous component to be infiltrated are contained in a bag during the infiltration process. The bag system may waste a significant amount of slurry, as an imprecise and/or inconsistent amount of slurry may be added to the bag.

A slurry infiltration fixture according to the present disclosure includes a fixture main body that is substantially rigid and includes a plurality of fixture walls that define a cavity configured to receive a component, such as a porous component. The plurality of fixture walls may include a shape configured to define a fixed offset between the component and the fixture walls. This defines a fixed volume for slurry between the plurality of fixture walls and the porous component. This may facilitate use of a more consistent amount of slurry for the component, which may reduce slurry waste, and, thus, cost of slurry infiltration.

In some implementations, the slurry infiltration fixture may provide for simple assembly, resulting in more efficient slurry infiltration processing. For instance, the slurry infiltration fixture may be formed from a fixture main body that includes multiple parts, such as opposing members, which may be assembled together and registered to each other by one or more alignment features. This may facilitate assembly of the slurry infiltration fixture prior to slurry infiltration and disassembly of the slurry infiltration fixture after slurry infiltration. This may also facilitate cleaning of the slurry infiltration fixture, which may enable the slurry infiltration fixture to be reused in multiple slurry infiltration processes.

In some examples, the slurry infiltration fixture may include a slurry introduction channel, which extends from a top of the slurry infiltration fixture and opens into the cavity proximate a bottom of the cavity. By introducing the slurry to the bottom of the cavity, the slurry may force air or other gases from the fixture and/or component as the slurry rises/flows up into the fixture. This may assist in forming consistent slurry infiltrated components with reduced or minimized variation due to trapped or entrained air or other gases in the slurry or pores of the component.

In some examples, the slurry infiltration fixture according to the present disclosure may include one or more features configured to improve heat transfer to and/or from the component or components within the cavity of the slurry infiltration fixture relative to conventional slurry infiltration fixtures. Improved heat transfer may result in more efficient processing because, in some examples, slurry may be cured by immersing the slurry infiltration fixture in a fluid bath or otherwise heating the slurry infiltration fixture. Improved heat transfer also may result in faster slurry cure times, which may result in more efficient performance of the slurry infiltration process.

Figure 2:
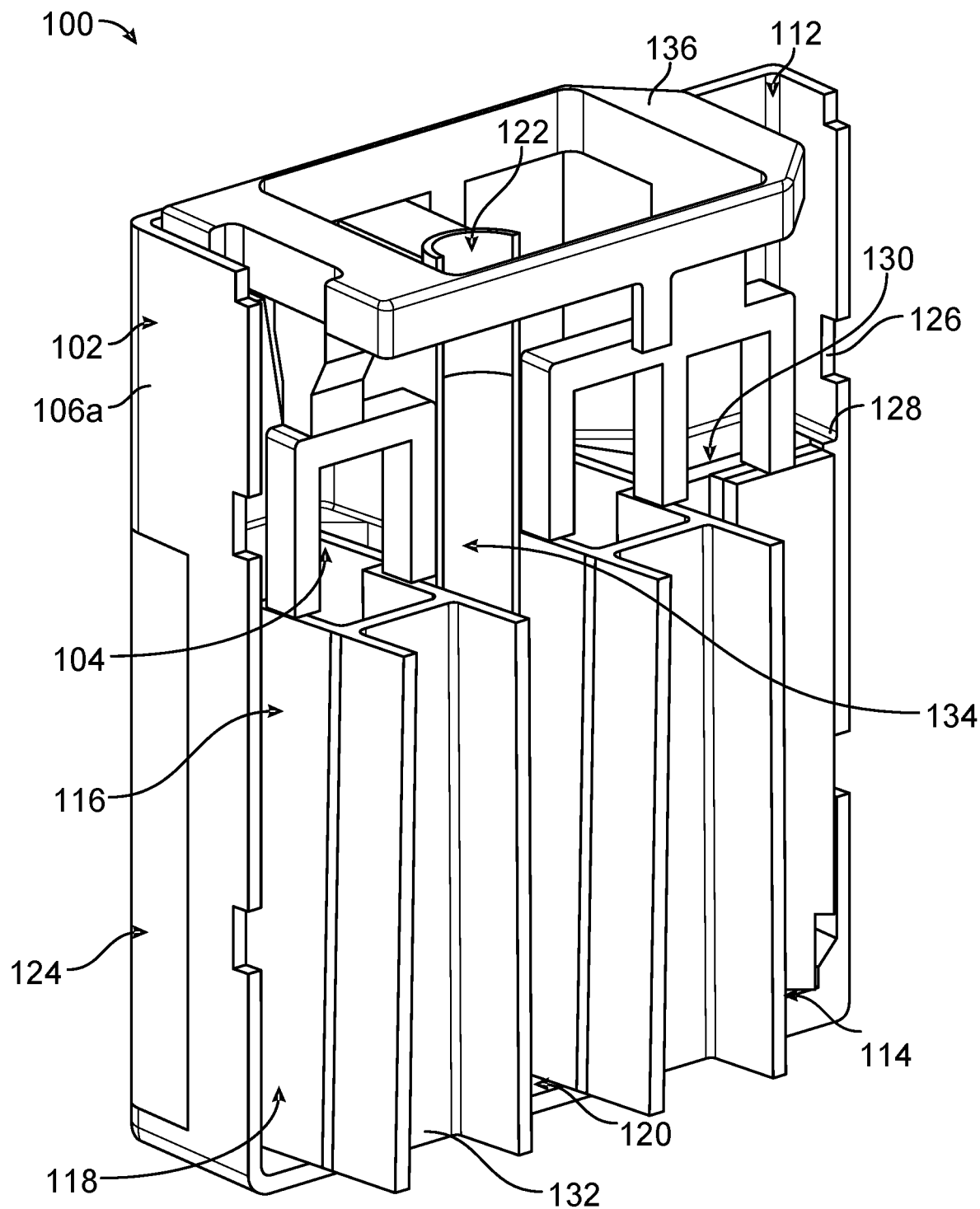
FIG. 2 is a schematic perspective view illustrating the example slurry infiltration fixture of FIG. 1 with one of the opposing members which make up the slurry infiltration fixture main body removed, in accordance with some examples of the present disclosure.
Figure 3:
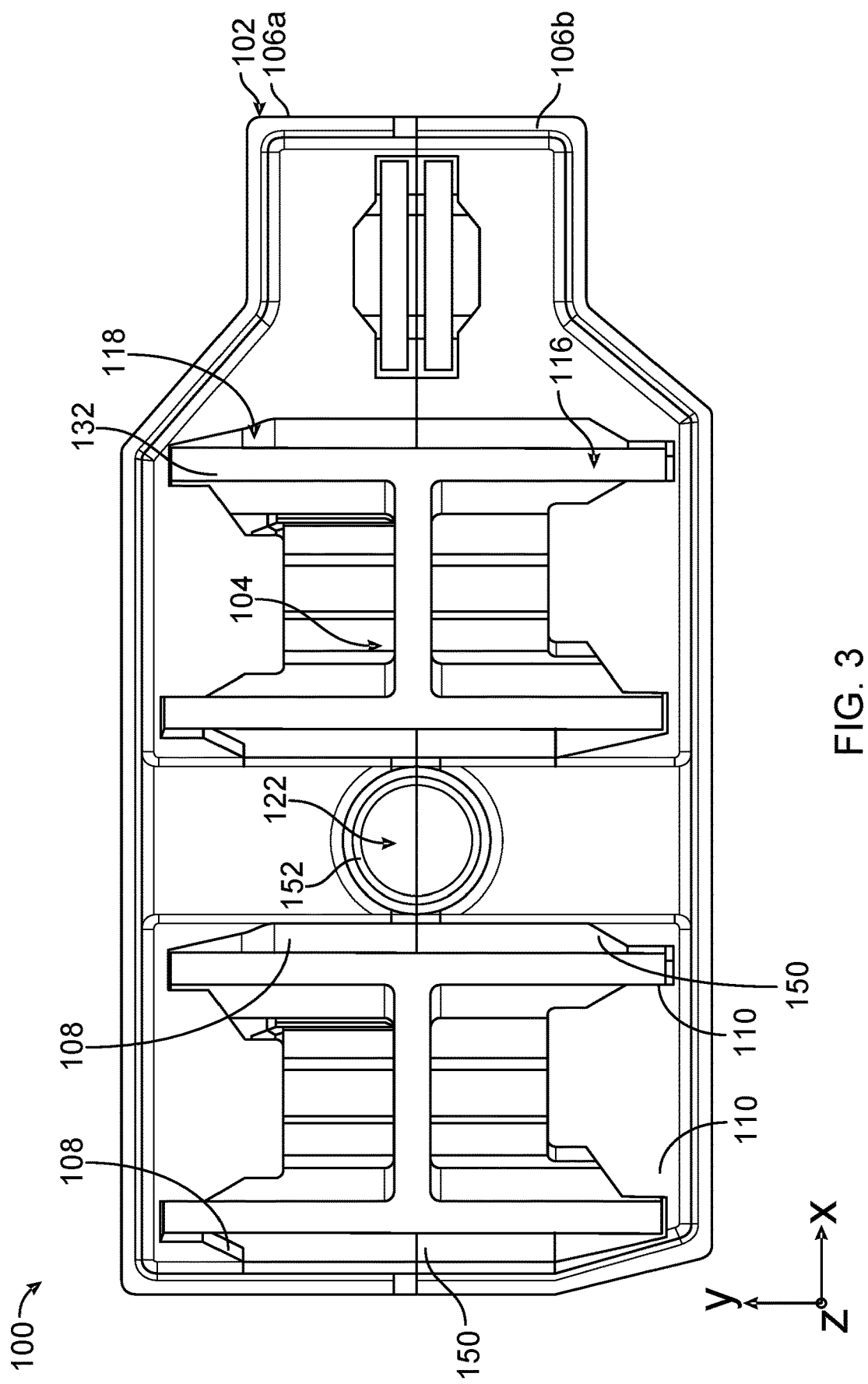
FIG. 3 is a schematic top view illustrating the example slurry infiltration fixture of FIGS. 1 and 2, in accordance with some examples of the present disclosure.

FIG. 1 is a schematic perspective view illustrating an example slurry infiltration fixture 100, in accordance with some examples of the present disclosure. FIG. 2 is a schematic perspective view illustrating the example slurry infiltration fixture 100 of FIG. 1 with one of the opposing members 106 which make up fixture main body 102 removed, in accordance with some examples of the present disclosure. FIG. 3 is a schematic top view illustrating example slurry infiltration fixture 100. In FIG. 1, example slurry infiltration fixture 100 is pictured with fixture main body 102 assembled, including first and second opposing members 106a and 106b (collectively, "opposing members 106"). In FIG. 2, slurry infiltration fixture 100 is illustrated with second opposing member 106b removed, such that only first opposing member 106 is shown.

Fixture main body 102 may be formed from one or more materials. In some examples, the one or more materials may be selected to provide relatively high heat conductivity compared to a fixture main body comprising other materials, be relatively low-outgassing under vacuum, and/or exhibit a relatively low surface energy so that slurry does not adhere to or is relatively easily removed from fixture main body 102. A material that exhibits relatively low surface energy may allow component 132 to be removed more easily after slurry infiltration and allows fixture main body 102 may be cleaned and reused. A material that has low out-gassing properties under vacuum may reduce contamination of component 132 and the slurry if component 132 is infiltrated under vacuum. In some examples, fixture main body 102 is formed of a material that exhibits a relatively low total mass loss (TML) (e.g., as a result of the slurry infiltration process described herein). In some examples, fixture main body 102 is formed of a material that exhibits a TML of less than about 1% of its total mass. Additionally, or alternatively, the material forming fixture main body 102 may be a relatively low collected volatile condensable material (CVCM) (e.g., with a CVCM of less than about 0.1). Additionally, or alternatively, the material forming fixture main body 102 may be formed of a material with low-outgassing properties. In some examples, fixture main body 102 may include a metal, polymer, composite (e.g., a fiber-filled plastic), or the like. In some examples, fixture main body 102 includes polytetrafluoroethylene, polylactic acid (PLA), or the like. In some implementations, fixture main body 102 is substantially rigid (e.g., does not appreciable deform under the conditions to which fixture main body 102 is exposed during normal use).

Fixture main body 102 includes at least two opposing members 106. At least two opposing members 106 may include a first opposing member 106a and a second opposing member 106b (collectively, "opposing members 106" or individually, "opposing member 106"). At least two members 106 fit together to form fixture main body 102 and define at least one cavity 104. In some examples, at least two opposing members 106 may include more than two members. For example, additional opposing members may include an additional member configured to serve as a bottom of fixture main body 102, and/or an additional member configured to serve as a cover of fixture main body 102.

In some examples, at least two opposing members 106 may fluidically seal or nearly fluidically seal at least one cavity 104. A fluidically sealed cavity is a cavity that does not allow a fluid, such as water or a liquid carrier in the slurry, into and/or out of at least one cavity 104. In some examples, a duct tape or another adhesive tape may be applied over the interface between first opposing member 160a and second opposing member 106b to assist in fluidic sealing. In the example illustrated by FIGS. 1-3, at least two opposing members 106 are configured to clamshell to define at least one cavity 104, which holds a component 132 or components during slurry infiltration. After slurry infiltration, the clamshell including at least two opposing members 106 may be separated to remove component 132 and clean fixture main body 102 so it may be reused. In some examples, fixture main body 102 may include one or more slots configured to receive a pry bar or other tool to assist in separating at least two opposing members 106.

In some examples, opposing members 106 may include one or more alignment features 126. One or more alignment features 126 may be located at the interface of opposing members 106. One or more alignment features 126 may serve to align opposing members 106 when fixture main body 102 is assembled. A machine or operator may use one or more alignment features 126 to orient and fit together opposing members 106. In some examples, one or more alignment features 126 may be key and slot features, such as in the example illustrated by FIGS. 1 and 2. A key and slot feature may include a protrusion or key feature in one opposing member (e.g., second opposing member 106b) that fits a slot feature or depression in another opposing member (e.g., first opposing member 106a).

Fixture main body 102 (e.g., opposing members 106) defines at least one cavity 104. At least one cavity 104 may include a single cavity or a plurality of cavities. For instance, as shown in FIGS. 1-3, fixture main body 102 defines three cavities. At least one cavity 104 is a void volume within fixture main body 102 configured to receive a part or component for slurry infiltration processing. At least one cavity 104 extends from a cavity top 112 to a cavity bottom 114 and includes a component volume 116 and a reservoir volume 130. As illustrated in FIG. 2, component volume 116 is designed to hold a component 132 or a plurality of components during a slurry infiltration technique. Reservoir volume 130 is configured to hold excess slurry at a beginning of a slurry infiltration process to ensure there is sufficient slurry within at least one cavity 104 to fill pores of component 132.

In some examples, each cavity of at least one cavity 104 may be substantially the same (e.g., have substantially the same shape and size). This may allow parallel processing of a plurality of substantially similar parts using slurry infiltration fixture 100. In other examples, at least one cavity 104 may include one or more cavities that differ, e.g., in size, shape, or both. In the example of FIGS. 1-3, slurry infiltration fixture 100 includes two substantially similar cavities and one different cavity. This may allow parallel processing of at least two similar components 132 within the substantially similar cavities, and processing of a different part in the different cavity. The different part may be, for example, a test coupon used to evaluate results of the slurry infiltration process, a different component, or the like.

In some examples, component 132 may include a porous preform. For instance, component 132 may include a porous preform used as part of manufacturing a ceramic matrix composite (CMC). Component 132 may include a ceramic (e.g., in the form of ceramic fibers), such as silicon nitride ($Si_3N_4$), silicon carbide (SiC), alumina ($Al_2O_3$), mullite ($3Al_2O_3 2SiO_2$ or $2Al_2O_3 SiO_2$), carbon, zirconia ($ZrO_2$), or the like). In some implementations, component 132 may be a ceramic fiber preform, fiber preform, or preform. In some implementations, component 132 may be pretreated (e.g., rigidized) using a chemical vapor infiltration and/or chemical vapor deposition process before being positioned in component volume 116 of at least one cavity 104. For instance, an interphase ceramic coating may be applied to the fibers of the porous preform using the chemical vapor infiltration and/or chemical vapor deposition process. The interphase ceramic coating may include, for example, boron nitride, pyrocarbon, micas, phyllosiloxides, or the like.

In some examples, component 132 may include one or more of the example fiber preforms described in U.S. Published Patent Application Nos. 2021/0147303 by Bortoluzzi et al.; 2021/0155558 by Bortoluzzi et al.; and/or 2021/0147302 by Bortoluzzi et al. The entire content of each of these applications is incorporated herein by reference.

For example, as described in U.S. Published Patent Application No. 2021/0147303, component 132 may include a fiber preform, where the fiber preform is formed by layering a plurality of plies together, with each ply having a predetermined position in the fiber preform. The fibers used in the preform, furthermore, may comprise any number of different materials capable of withstanding the high processing temperatures used in preparing and operating CMC components, such as, but not limited to, carbon fibers, ceramic fibers (e.g., silicon carbide, alumina, mullite, zirconia, or silicon nitride), which can be crystalline or amorphous. The ceramic fibers may be suitably coated by various methods. Alternatively, the fiber preform comprises fibers that include one or more of silicon carbide (SiC), silicon nitride ($Si_3N_4$), or a mixture or combination thereof. Each of the fibers is individually selected and may be of the same or different composition and/or diameter. Alternatively, the fibers are the same in at least one of said composition and/or diameter. The ceramic fiber filaments may have a diameter that is between about 1 micrometer (μm) to about 50 μm; alternatively, about 5 μm to about 30 μm; alternatively, about 10 μm to about 20 μm.

As another example, as described in U.S. Published Patent Application No. 2021/0155558, component 132 may by an article is made from a lay-up of a plurality of continuous ceramic fibers, formed to a desired shape. Prior to slurry infiltration, the lay-up may be a ceramic fiber preform, fiber preform, or preform. The fiber preform, which may be partially rigid or non-rigid, may be constructed in any number of different configurations. For example, the preform may be made of filament windings, braiding, and/or knotting of fibers, and may include two-dimensional and three-dimensional fabrics, unidirectional fabrics, and/or nonwoven textiles. The fibers used in the preform, furthermore, may comprise any number of different materials capable of withstanding the high processing temperatures used in preparing and operating CMC articles, such as, but not limited to, carbon fibers, ceramic fibers (e.g., silicon carbide, alumina, mullite, zirconia, or silicon nitride), which can be crystalline or amorphous. The ceramic fibers may be suitably coated by various methods. Alternatively, the fiber preform comprises fibers that include one or more of silicon carbide (SiC), silicon nitride (Si3N4), or a mixture or combination thereof. Each of the fibers is individually selected and may be of the same or different composition and/or diameter. Alternatively, the fibers are the same in at least one of said composition and/or diameter. The ceramic fiber filaments may have a diameter that is between about 1 micrometer (μm) to about 50 μm; alternatively, about 5 μm to about 30 μm; alternatively, about 10 μm to about μm.

Fixture main body 102 includes a plurality of fixture walls 108 (labelled in FIG. 3), which define at least one cavity 104 and include a shape configured to define a fixed offset 118 between component 132 and fixture walls 108. Fixed offset 118 may be an additional void volume of component volume 116 of at least one cavity 104 that is not designed to be occupied by component 132. Rather, fixed offset 118 may be a gap or space between fixture walls 108 and surfaces of component 132 and be configured to be filled by slurry during the slurry infiltration process. In some examples, fixed offset 118 substantially fully surrounds (e.g., surrounds or nearly surrounds) component 132. This may allow slurry to contact substantially all or nearly all surfaces of component 132 when component 132 occupies component volume 116 of at least one cavity 104. In other examples, fixed offset 118 may surround a portion or portions of component volume 116 (e.g., a majority of surface area of component 132), so that when slurry infiltration fixture 100 is filled with slurry the slurry contacts the portion or portions of component 132 (e.g., a majority of the surface area of component 132) that are surrounded by fixed offset 118.

Fixed offset 118 may be defined by the shape of fixture walls 108. In some examples, as shown in FIGS. 1-3, the shape of fixture walls 108 may include contact portions 110 and offset portions 150. Contact portions 110 of fixture walls 108 are configured to contact portions of component 132 to position component within component volume 116. Contact portions 110 of fixture walls 108 also may be configured to restrain movement of component 132 within component volume 116 of cavity 104. For instance, contact portions 110 may be configured to restrain movement of component 132 within an x-y plane shown in FIG. 3 (where orthogonal x-y-z axes are shown in FIG. 3 for purposes of illustration only). In some examples, as shown in FIGS. 1-3, contact portions 110 may be at one or more edges or one or more portions of a perimeter of component 132, e.g., to reduce contact between component 132 and fixture walls 108 while allowing contact portions 110 to position and restrain component 132.

Offset portions 150 of fixture walls 108 extend from contact portions 110 and surround at least a portion of component 132. Offset portions 150 define fixed offset 118 between points on component 132 and corresponding points on offset portions 150. That is, because contact portions 110 restrain component 132 within component volume 116 and fixture walls 108 are substantially rigid, the spacing (in a direction orthogonal to a point on offset portions 150) between the point on offset portions 150 and a corresponding point on component 132 and may be substantially fixed (e.g., fixed or nearly fixed. The respective spacings between each pair of a point on component 132 and a corresponding point on offset portions 150 may not be the same, e.g., the spacing between a first point on component 132 and a first corresponding point on offset portions 150 may be different from the spacing between a second point on component 132 and a second corresponding point on offset portions 150.

The dimensions of fixed offset 118 may define a space or gap between component volume 116 and fixture main body 102 sufficiently large for slurry to flow between fixture walls 108 and component 132 during introduction of slurry into component volume 116. Conversely, the dimensions of fixed offset 118 may define a space or gap between component volume 116 and fixture main body 102 sufficiently small to reduce or limit excess slurry that is not needed for the slurry infiltration process.

In some examples, fixed offset 118 may define a substantially constant space or gap between fixture walls 108 and component 132 as a function of position along component 132. In other examples, fixed offset 118 may define a varying space or gap between fixture walls 108 and component 132 as a function of position along component 132. In either case, because fixed offset 118 is defined by a relatively rigid fixture main body 102, fixed offset 118 may define a known volume between walls of component 132 and fixture walls 108. This may facilitate use of a known volume of slurry for slurry infiltration of component 132.

In other examples, rather than including contact portions 110 and offset portions 150, fixture walls 108 may include a plurality of protrusions or projections, which protrude or project into component volume 116 to define fixed offset 118. The plurality of protrusions or projections may be located at any positions along fixture walls 108 and may include any number of protrusions or projections.

In some examples, component volume 116 may be configured to contain a single component 132. In some examples, component volume 116 may be configured to contain a plurality of components.

Fixture main body 102 also includes a slurry introduction channel 134. Slurry introduction channel 134 extends from an inlet 122 to an outlet 120, also referred to as a cavity entrance 120. Inlet 122 is at or near a top of fixture main body 102. Cavity entrance 120 is at or adjacent to cavity bottom 114. Cavity entrance 120 may be an aperture in fixture main body 102 that allows slurry to flow into at least one cavity 104 from slurry introduction channel 134. Cavity entrance 120 may be defined proximate to cavity bottom 114 of at least one cavity 104. For example, cavity entrance 120 proximate to cavity bottom 114 may be an aperture that is closer to cavity bottom 114 than to cavity top 112, or within 25% of a height of fixture main body 102 from cavity bottom 114, or within 10% of a height of fixture main body 102 from cavity bottom 114. Locating cavity entrance 120 proximate to cavity bottom 114 results in slurry being introduced to cavity 104 near a bottom surface of cavity 104, so slurry flows upwards through cavity 104 during the slurry introduction process. This may reduce or substantially eliminate the entrainment of air or other gases within the slurry or porosity of component 132 when the slurry enters at least one cavity 104. Instead, slurry flowing into cavity may push air or other gases out cavity top 112. Further, by including inlet 122 at or near a top of fixture main body 102, slurry may be more easily poured into slurry introduction channel 134.

In some examples, slurry infiltration fixture 100 includes a lip 128 which extends above component volume 116 to define reservoir volume 130 of at least one cavity 104. Reservoir volume 130 may be configured contain a known volume of slurry that enters at least one cavity 104 after fixed offset 118 is filled with slurry. In some examples, during slurry infiltration processing, slurry from reservoir volume 130 may be drawn down into fixed offset 118 when slurry originally in fixed offset 118 infiltrates into a porosity of component 132. Lip 128 provides a visual marker to help define reservoir volume 130 and ensure that a desired amount of slurry is introduced into cavity 104 prior to the slurry infiltration process. In some examples, reservoir volume 130 may be completely filled with slurry prior to the slurry infiltration process. In this way, slurry infiltration fixture 100 may be configured to be provided with a consistent amount of slurry per slurry infiltration process.

In some examples, slurry infiltration fixture 100 may include at least one anti-flotation element 136. At least one anti-flotation element 136 may shaped to be positioned within at least one cavity 104 and interact with fixture main body 102 to help restrain component 132 from floating upward when slurry is introduced into at least one cavity. In some implementations, at least one anti-flotation element 136 may interface with fixture main body 102 through an interference fit, a friction fit, or the like. In some examples, at least one anti-flotation element 136 may be configured to contact a relatively small area of component 132 to reduce surface area through which slurry is not infiltrated into porosity of component 132. At least one anti-flotation element 136 may be formed from any suitable material, such as any material from which fixture main body 102 may be formed.

In some examples, fixture main body 102 may include one or more features configured to improve heat transfer between cavity 104 and the environment surrounding fixture main body 102. For example, an exterior surface of fixture main body 102 may define a plurality of depressions 124. Plurality of depressions 124 may reduce the thickness of fixture main body 102 and increase surface area of exterior surface of fixture main body, both of which may improve heat transfer between the surroundings of fixture main body 102 and at least one cavity 104. In some implementations, depressions 124 may be shaped and sized so that, fixture main body 102 may have a substantially constant wall thickness surrounding component volume 116.

Figure 4:
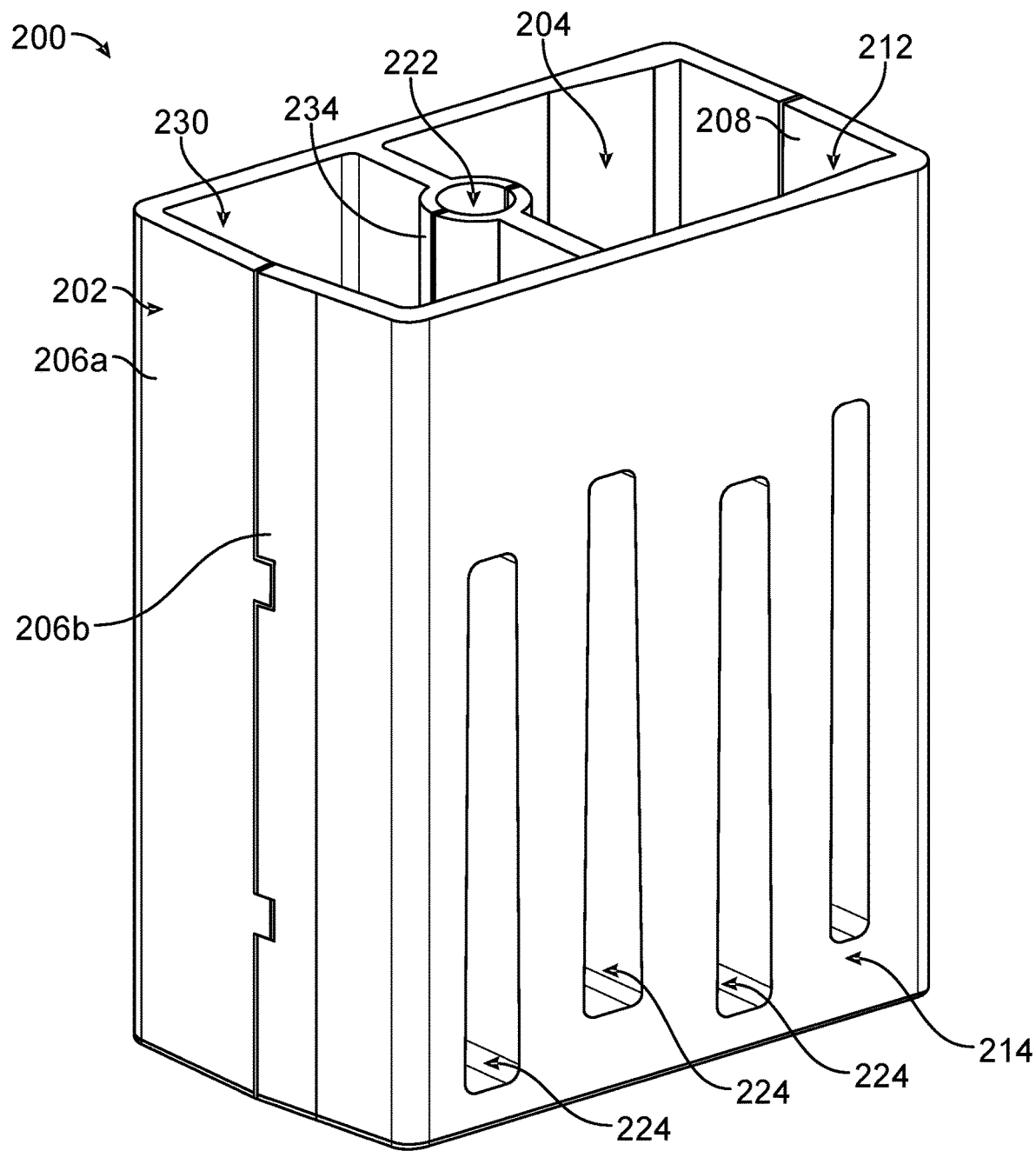
FIG. 4 is a schematic perspective view illustrating another example slurry infiltration fixture, in accordance with some examples of the present disclosure.
Figure 5:
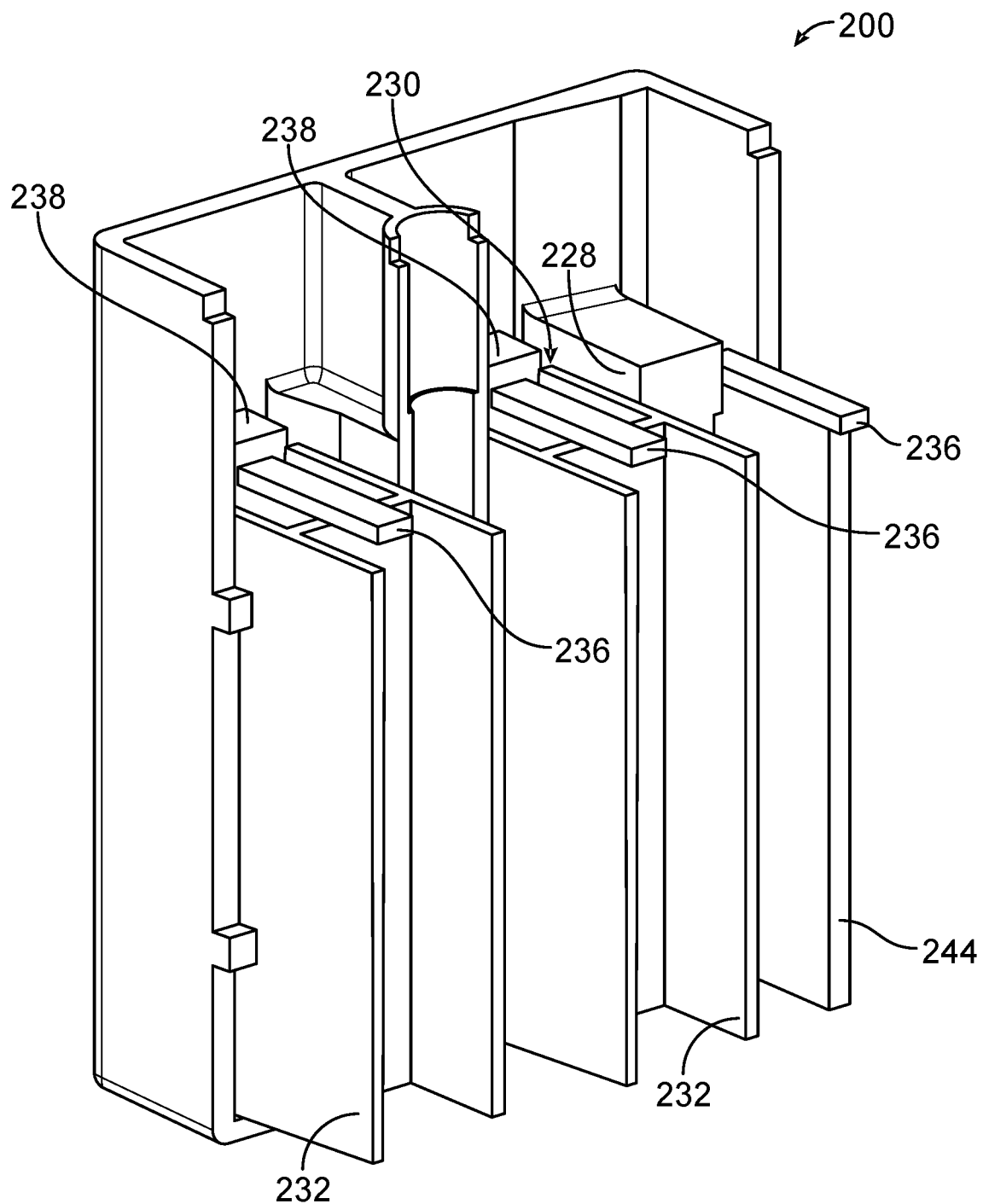
FIG. 5 is a schematic perspective view illustrating the example slurry infiltration fixture of FIG. 4 with one of the opposing members that make up the slurry infiltration fixture main body removed, in accordance with some examples of the present disclosure.
Figure 6:
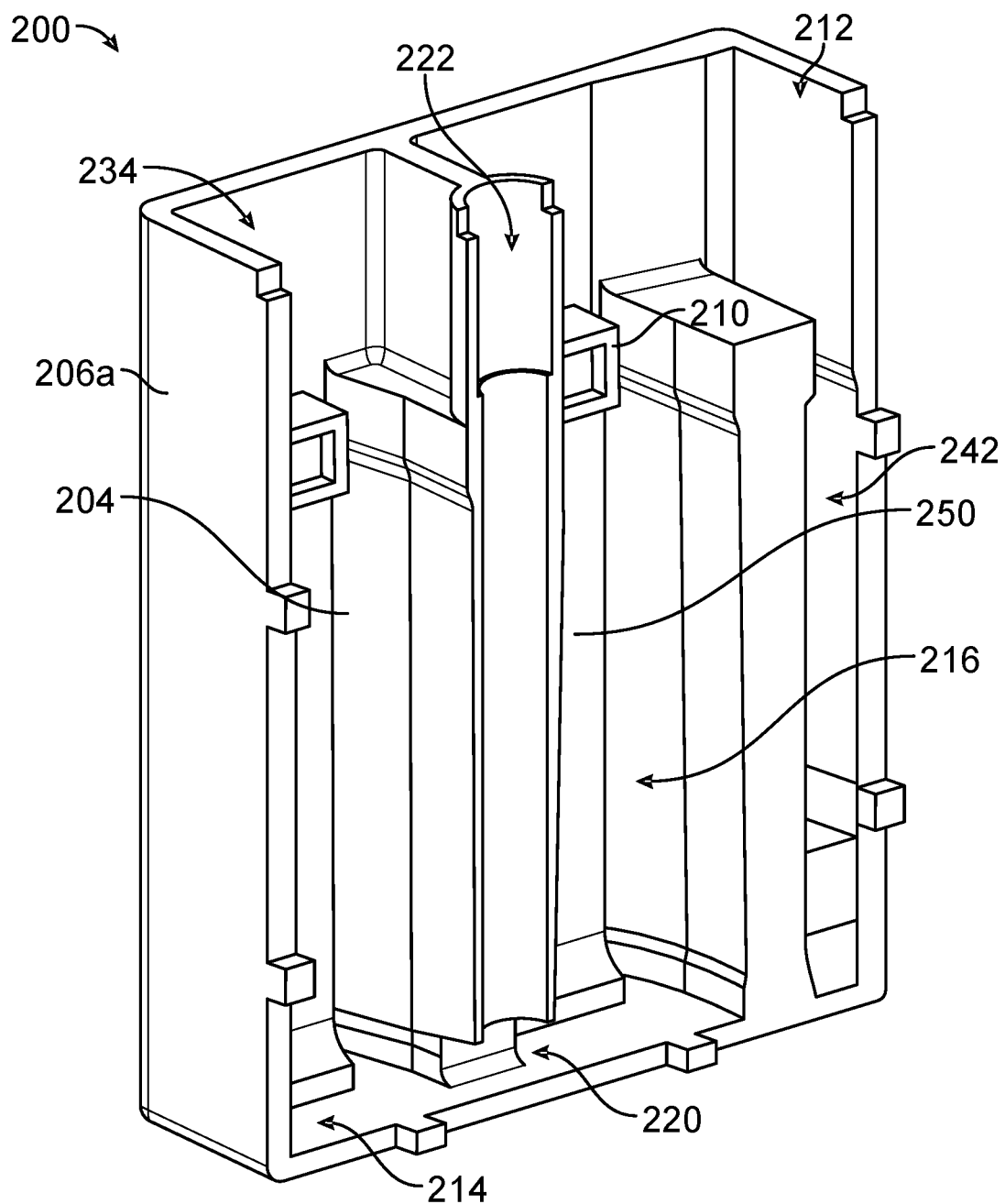
FIG. 6 is a schematic perspective view illustrating one of the opposing members that make up the slurry infiltration fixture main body of the example slurry infiltration fixture of FIGS. 4 and 5, in accordance with some examples of the present disclosure.

FIGS. 4-6 illustrate another example of a slurry infiltration fixture 200, in accordance with some examples of this disclosure. Slurry infiltration fixture 200 may be similar to or substantially the same as slurry infiltration fixture 100 of FIGS. 1-3, aside from the differences described herein. In FIG. 4, at least two opposing members 206a and 206b are illustrated with both first opposing member 206a and second opposing member 206b shown. In FIGS. 5 and 6, only first opposing member 206a of at least two opposing members 206 is illustrated. In FIG. 5, at least one component 232 is illustrated in component volume 216 of at least one cavity 204, and a test coupon 244 is illustrated in a test coupon volume 242.

Fixture main body 202 defines at least one cavity 204, which extends from cavity top 212 to cavity bottom 214. Fixture main body 202 also includes slurry introduction channel 234, which extends from inlet 222 to outlet 220. Outlet 220 is proximate to cavity bottom 214.

Fixture walls 208 define contact portions 210 and offset portions 250. As seen in FIGS. 5 and 6, contact portions 210 contact at least one component 232 to locate component 232 in cavity 204. Offset portions 250 do not contact at least one component 232 and define a fixed offset between at least one component 232 and fixture walls 208. Fixture walls 208 also define a lip 228, which defines a reservoir portion of cavity 204.

Slurry infiltration fixture 200 also includes a plurality of anti-flotations elements 236, which interact with fixture main body 202 and restrain at least one component 232 from floating when cavity 204 is filled with slurry. As shown in FIG. 5, plurality of anti-flotations elements 236 contact at least one locating feature 238, which may be a projection defined in fixture main body 202, and contact the top of at least one component 232.

At least one locating feature 238 locate at least one anti-flotation components 236, which hold components 232 and test coupon 244 in their corresponding volumes and prevent components 232 and test coupon 244 from floating on slurry into reservoir volume 230.

In FIG. 6, only first opposing member 206a is illustrated. Slurry introduction channel 234 with inlet 222 substantially at the cavity top 212 of at least one cavity 204 is configured to guide slurry to the outlet 220 of slurry introduction channel 234. Outlet 220 is substantially at cavity bottom 214 of cavity 204.

Figure 7:
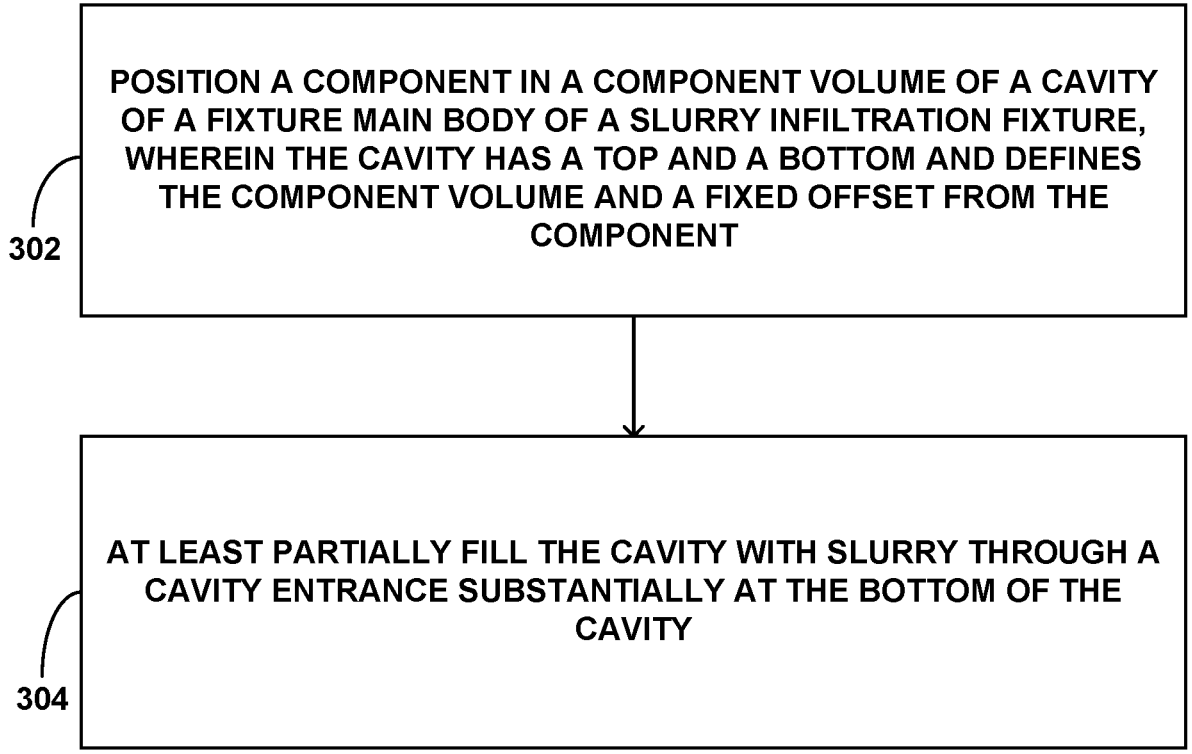
FIG. 7 is a flowchart illustrating an example technique according to the present disclosure.

FIG. 7 is a flowchart illustrating a technique for slurry infiltration, in accordance with some examples of the present disclosure. FIG. 7 will be described with reference to slurry infiltration fixture 100 as described and illustrated in FIGS. 1-3. However, a person having skill in the art will understand that the technique of FIG. 7 may be performed using another slurry infiltration fixture, such as slurry infiltration fixture 200 of FIGS. 4-6, and that slurry infiltration fixture 100 may be used to perform other techniques. The technique of FIG. 7 includes positioning at least one component 132 in a component volume 116 of at least one cavity 104 of a fixture main body 102 of a slurry infiltration fixture 100 (302). At least one cavity 104 has a cavity top 112 and a cavity bottom 114 and defines component volume 116 and a reservoir volume 130. Fixture main body 102 also includes a slurry introduction channel 134.

The technique of FIG. 7 also includes at least partially filling at least one cavity 104 with slurry through a cavity entrance 120 substantially at cavity bottom 114 of at least one cavity 104 (304). In some examples, at least partially filling at least one cavity 104 with slurry through a cavity entrance 120 substantially at cavity bottom 114 may include pouring slurry into at least one slurry introduction channel 134 that extends from an inlet 122 substantially at the cavity top 112 to an outlet 120 substantially at cavity bottom 114. In some examples, the technique may further include at least partially filling a reservoir volume 130 defined by a lip 128 extending beyond the height of component volume 116 with slurry.

As noted above, locating cavity entrance 120 proximate to cavity bottom 114 may result in slurry being introduced to cavity 104 near a bottom surface of cavity 104, so slurry flows upwards through cavity 104 during the slurry introduction process. This may reduce or substantially eliminate the entrainment of air or other gases within the slurry or porosity of component 132 when the slurry enters at least one cavity 104. Instead, slurry flowing into cavity may push air or other gases out cavity top 112. Further, by including inlet 122 at or near a top of fixture main body 102, slurry may be more easily poured into slurry introduction channel 134.

In some examples, the technique of FIG. 7 may further include, before or after at least partially filling at least one cavity 104 with slurry, positioning slurry infiltration fixture 100 in a chamber (e.g., vacuum chamber or inert chamber at atmospheric pressure). In other words, in some examples, fixture 100 may be positioned into the chamber prior to infiltration, and cavity 104 of slurry infiltration fixture 100 may be at least partially filled with slurry while slurry infiltration fixture 100 is positioned in a chamber. Subsequent to treatment in a chamber, the technique of FIG. 7 may further include heating slurry infiltration fixture 100, the slurry, and at least one component 132. For example, to heat fixture 100 and component 132, slurry infiltration fixture 100 with component 132 may be placed in a heated water (or other liquid) bath, e.g., with the water level being below top 112. The slurry may infiltrate into porosity of at least one component 132 (under vacuum or under atmospheric pressure) while in the chamber, and the heat may facilitate infiltration and/or curing of the slurry within porosity of at least one component 132 while in the water (or other liquid) bath. After the slurry is cured, slurry infiltration fixture 100 may or may not be cooled down (e.g., a cool down may not be needed in instances in which the water of the water bath is relatively low). The technique of FIG. 7 may further include opening slurry infiltration fixture 100 to remove at least one component 132. In some examples, the resulting component may undergo one or more further processing step, e.g., including being optionally machined after undergoing infiltration to form a suitable finished component or article.

In some examples, the infiltration process may include, upon introducing the slurry through cavity entrance 120, flowing the slurry along one or more surfaces of component 132 while component 132 is positioned within cavity 104, to infiltrate the porous component 132 with the slurry. In some examples, as noted above, the infiltration process may be carried out in an inert environment under atmospheric pressure, e.g., in order to minimize evaporative losses.

An example technique in accordance with FIG. 7 includes first positioning at least one component 132 into slurry infiltration fixture 100. Next, slurry infiltration fixture 100 is placed in a (vacuum) chamber, followed by infiltrating slurry. Slurry infiltration fixture 100 is then removed from the (vacuum) chamber and placed in a water bath. The slurry is heated up in the water bath to "cure" the slurry, and then slurry infiltration fixture 100 is removed from the water bath and parts are cleaned. In this example, the water in the water bath may be at relatively low temperature so there may not be a need to cooldown.

The example infiltration technique of FIG. 7 is just one technique that may employ the example infiltration fixtures described herein. However, other example slurry infiltration techniques may be carried out using one or more of the example infiltration fixtures described herein. For example, the example infiltration fixture describe herein may be employed to carry out one or more aspects of one or more of the example infiltration techniques described in U.S. Published Patent Application Nos. 2021/0147303 by Bortoluzzi et al.; 2021/0155558 by Bortoluzzi et al.; and/or 2021/0147302 by Bortoluzzi et al. For example, example porous component infiltration techniques describes in one or more of these applications may be carried out, e.g., with a fixture including fixture walls having a shape configured to define a fixed offset between the porous component and the fixture walls and a fixed volume for slurry between the plurality of fixture walls and the porous component, and/or a fixture with a slurry introduction channel is configured introduce the slurry into a cavity through an opening proximate a bottom of the cavity.

Various examples have been described. These and other examples are within the scope of the following claims.

What is claimed is:
1. A slurry infiltration fixture comprising:
 a fixture main body that comprises a slurry introduction channel and a plurality of fixture walls defining a cavity configured to receive a porous component, wherein the cavity includes a component volume and a reservoir volume;

wherein the plurality of fixture walls form a shape which defines a fixed offset between the porous component and the plurality of fixture walls and a fixed volume for slurry between the plurality of fixture walls and the porous component; and wherein the slurry introduction channel is configured to introduce the slurry into the cavity through an opening proximate a bottom of the cavity, wherein the slurry introduction channel extends through the fixture main body from an inlet proximate the top of the fixture main body to the opening proximate the bottom of the cavity.

2. The slurry infiltration fixture of claim 1, wherein the fixture main body further comprises a lip defined in at least one fixture wall of the plurality of fixture walls, wherein the lip is positioned above a height of the component volume and defines the reservoir volume of the cavity configured to receive excess slurry.

3. The slurry infiltration fixture of claim 2, further comprising an anti-flotation element configured to be positioned within the reservoir volume, wherein the anti-flotation element is configured to restrain the porous component from floating when the cavity is filled with slurry.

4. The slurry infiltration fixture of claim 1, wherein the fixture main body comprises at least two opposing members configured to define the cavity.

5. The slurry infiltration fixture of claim 4, wherein the at least two opposing members further comprise one or more alignment features configured to facilitate positioning of the at least two opposing members relative to each other.

6. The slurry infiltration fixture of claim 5, wherein the one or more alignment features comprise key and slot features at the interface of the at least two opposing members.

7. The slurry infiltration fixture of claim 1, wherein the fixture main body comprises a low-outgassing material that exhibits a total mass loss (TML) of less than one percent during a slurry infiltration process.

8. The slurry infiltration fixture of claim 1, wherein the fixture main body comprises at least one of a metal or a plastic.

9. The slurry infiltration fixture of claim 1, wherein the fixture main body comprises polytetrafluoroethylene.

10. The slurry infiltration fixture of claim 1, further comprising an anti-flotation element configured to restrain the porous component from floating when the cavity is filled with slurry.

11. The slurry infiltration fixture of claim 10, wherein the anti-flotation element comprises at least one locating feature configured to locate the porous component in the cavity.

12. The slurry infiltration fixture of claim 1, further comprising at least one locating feature configured to locate the porous component in the cavity.

13. The slurry infiltration fixture of claim 1, wherein the fixture main body comprises a plurality of externally facing protrusions and depressions configured to transfer heat to the cavity from surroundings of the slurry infiltration fixture.

14. The slurry infiltration fixture of claim 1, wherein the cavity comprises a first cavity, and wherein the fixture main body defines a plurality of cavities, each cavity of the plurality of cavities being substantially identical to the first cavity.

15. The slurry infiltration fixture of claim 1, wherein the cavity comprises a first cavity, further comprising a second cavity defining a test coupon volume.

16. A method of slurry infiltration, the method comprising:

positioning a porous component in a component volume of a cavity defined by a fixture main body of a slurry infiltration fixture, wherein the cavity includes the component volume and a reservoir volume, wherein the fixture main body defines a slurry introduction channel, wherein the plurality of fixture walls form a shape which defines a fixed offset between the porous component and the plurality of fixture walls and a fixed volume for slurry between the plurality of fixture walls and the porous component; and introducing slurry into the cavity through the slurry introduction channel, wherein the slurry introduction channel comprises an opening into the cavity proximate to a bottom of the cavity, and wherein the slurry introduction channel extends through the fixture main body from an inlet proximate the top of the fixture main body to the opening proximate the bottom of the cavity.

17. The method of claim 16, wherein introducing slurry into the cavity comprises filling the component volume and the reservoir volume to a height of a lip positioned above a height of the porous component volume and defining a height of the reservoir volume.

18. The method of claim 16, further comprising assembling two opposing members to form the fixture main body.

19. The method of claim 18, wherein the at least two opposing members comprise one or more alignment features.

* * * * *